United States Patent [19]
Fowlow et al.

[11] Patent Number: 5,920,868
[45] Date of Patent: Jul. 6, 1999

[54] CATALOGING APPARATUS FOR FACILITATING THE RE-USE OF DISTRIBUTED OBJECTS IN A DISTRIBUTED OBJECT SYSTEM

[75] Inventors: Brad G. Fowlow, Redwood City; Greg B. Nuyens, Menlo Park; Keith L. Messer, San Francisco; Frank Ludolph, Menlo Park, all of Calif.

[73] Assignee: Sun Microsystems, Inc., Palo Alto, Calif.

[21] Appl. No.: 08/675,563

[22] Filed: Jul. 3, 1996

[51] Int. Cl.⁶ ........................................ G06F 17/30
[52] U.S. Cl. ........................................ 707/103
[58] Field of Search ................... 707/1, 10, 100, 707/103

[56] References Cited

U.S. PATENT DOCUMENTS

| | | | |
|---|---|---|---|
| 5,261,098 | 11/1993 | Katin et al. | 395/650 |
| 5,339,419 | 8/1994 | Chan et al. | 395/700 |
| 5,339,433 | 8/1994 | Frid-Nielsen | 395/700 |
| 5,392,448 | 2/1995 | Frankel et al. | 395/800.35 |
| 5,414,806 | 5/1995 | Richards | 395/135 |
| 5,446,902 | 8/1995 | Islam | 395/700 |
| 5,450,583 | 9/1995 | Inada | 395/650 |
| 5,475,817 | 12/1995 | Waldo et al. | 395/650 |
| 5,524,246 | 6/1996 | Hurley et al. | 395/700 |
| 5,598,557 | 1/1997 | Doner et al. | 707/5 |
| 5,646,992 | 7/1997 | Subler et al. | 380/4 |
| 5,659,735 | 8/1997 | Parrish et al. | 395/610 |
| 5,671,415 | 9/1997 | Hossain | 395/701 |
| 5,692,183 | 11/1997 | Hapner et al. | 395/614 |
| 5,699,310 | 12/1997 | Garloff et al. | 395/701 |
| 5,706,457 | 1/1998 | Dwyer et al. | 345/349 |
| 5,717,877 | 2/1998 | Orton et al. | 345/326 |
| 5,721,911 | 2/1998 | Ha et al. | 1/1 |
| 5,724,589 | 3/1998 | Wold | 395/701 |
| 5,761,686 | 6/1998 | Bloomberg | 707/529 |
| 5,781,773 | 7/1998 | Vanderpool et al. | 707/100 |
| 5,819,032 | 10/1998 | de Vries et al. | 395/200.8 |

OTHER PUBLICATIONS

Summers et al., "Visual Programming Language Bibliography", Nov. 29, 1995, Department of Computer Science from Oregon State Internet Website.

Al–Salqan et al., "MediaWare: A Distributed Multimedia Environment with Interoperability", Apr. 20, 1995, IEEE.

Gamma et al., "Design Patterns Elements of Reusable Object–Oriented Software", 1995, Addison–Wesley Professional Computing Series.

*Primary Examiner*—Maria N. Von Buhr
*Attorney, Agent, or Firm*—Beyer & Weaver, LLP

[57] ABSTRACT

A method, apparatus, and computer program product for selecting and reviewing a distributed object installed on a distributed object system. A method of the invention includes generating a library of components corresponding to distributed objects on the distributed object system, which includes one component corresponding to the distributed object. Each of the components of the library includes information describing the distributed object to which the particular component corresponds. The contents of the library are displayed using a catalog interface device. The library is browsed using the catalog interface device to identify the component corresponding to the distributed object which is then selected. At least a portion of the information describing the distributed object is displayed.

26 Claims, 6 Drawing Sheets

CATALOGING APPARATUS FOR FACILITATING THE RE-USE OF DISTRIBUTED OBJECTS IN A DISTRIBUTED OBJECT SYSTEM

BACKGROUND OF THE INVENTION

1. The Field of the Invention

The present invention relates to the fields of distributed computing systems, client-server computing and object-oriented programming. More specifically, the present invention includes a method and apparatus for creating object-oriented software applications for use on a distributed object system.

2. The Relevant Art

Object-oriented programming methodologies have received increasing attention over the past several years in response to the increasing tendency for software developed using traditional programming methods to be delivered late and over budget. One problem with traditional programming techniques stems from the emphasis placed on procedural models and "linear" code that often is extremely difficult to design and maintain. Generally, large programs created using traditional methods are "brittle", that is, even small changes to isolated elements of the program can affect all elements of the programming code. Thus, minor changes made to the software in response to user demands can require major redesign and rewriting of the entire program.

Object-oriented programming strategies tend to avoid these problems because object methodologies focus on manipulating data rather than procedures; thus providing the programmer with a more intuitive approach to modeling real world problems. In addition, objects encapsulate related data and procedures so as to hide that information from the remainder of the program by allowing access to the data and procedures only through the object's interface. Hence, changes to the data and/or procedures of the object are relatively isolated from the remainder of the program. This provides code that is more easily maintained as compared to code written using traditional methods, since changes to an object's code do not affect the code in the other objects. In addition, the inherent modular nature of objects allows individual objects to be re-used in different programs. Thus, programmers can develop libraries of "tried and true" objects that can be used over and over again in different applications. This increases software reliability while decreasing development time, as reliable programming code may be used repeatedly.

The object metaphor in distributed systems is a useful technique as it separates the object's interface from its implementation, thus allowing software designers to take advantage of the functionalities of various objects available to them without having to worry about the details of the object's implementation. The programmer need only be aware of the object's interface. In addition, object-oriented distributed systems allow for multiple implementations of a single interface, which interface may reside on different computing platforms that have been connected through a network. Thus, a programmer working on one machine of a network may make a call to an object about which the programmer has no detailed knowledge with the confidence that at the appropriate time the remote object will be accessed and return its data so that the programmer's code will function properly. Such a system thus maximizes the inherent advantages of object-oriented methodologies by taking full advantage of their modularity and encapsulation.

Attempts to provide such facilities have been made using object-oriented distributed systems that are based upon a client-server model, in which object-servers provide interfaces to clients that make requests of the object-servers. Typically, these servers are objects consisting of data and associated methods. The clients obtain access to the functionalities of the object-servers by executing calls on them, which calls are mediated by the distributed system. When the object-server receives the call it executes the appropriate method and transmits the result back to the object-client. The client and object-server communicate through an Object Request Broker (ORB) which is used to locate the various distributed objects and establish communications therebetween.

Although the advantages to employing object-oriented programming methodologies through distributed object systems are significant, there remain major hurdles to their implementation. In general, the goal of implementing the re-use of software during the programming process, even in the context of object programming, is difficult to achieve. Typically, programmers are reluctant to use code about which their understanding is minimal or even nonexistent. This is compounded in distributed object systems as the developer(s) of the code may not be easily reached to provide comments and instruction to the programmer whose task is to develop a new application. Thus, although much useful code may be available to the programmer throughout the distributed object system, that programmer may not be able to take full advantage of it, thus being forced to rewrite sections of code that have already been developed.

Present methodologies for sharing code are inadequate in the distributed object model. Current methods for sharing object code include the use of shared libraries, publicly available directories of header files, and the wide-spread distribution of documentation (either electronically or by hard copy). These methods, however, do not lend themselves well to adaptation in a distributed object environment in which the basic elements being manipulated are not file-based but rather are interface-based. Also, methods for re-using objects in a distributed object system should seek to increase the user's sense of a "community" of programmers and the code they produce. Thus, systems seeking to increase the re-use of objects in a distributed object system should facilitate the user's determination of an object's identity, its purpose, and its method of use.

As described in co-pending U.S. patent application Ser. No. 08/414,240 (pending), incorporated herein by reference for all purposes, another challenge to programming in a distributed object environment is the need to provide large amounts of "boilerplate" type computer code so that objects and applications developed for use in the distributed object system can function properly within that system; in particular, the need to provide basic computer code structures to enable ordinary objects (i.e., C++ objects) to function as distributed objects. In addition, however, the programmer seeking to maximize the re-use of existing objects and computer code in the distributed objects system is faced with similar although slightly different challenges. When a programmer wishes to employ an object in an application being developed, the programmer must indicate basic information pertaining to the object such as calls to the object's factory and provide various initialization data. In addition, a variety of make files, header files, and library dependencies must be accounted for in the code before that code is forwarded to additional facilities such as described in application Ser. No. 08/414,240 (pending). Additional details that must be provided by the programmer include various exception handling, debugging, and tracing support code. Again, although the methods and code required are generally known to those of skill in the art, the implementation of such routines is laborious, repetitive, and prone to error. Thus, the development of appropriately coded object applications is an extremely time consuming and painstaking task. It would therefore be preferable to automate the incorporation of such "housekeeping" code.

The full promise of object-oriented methodologies, especially the advantages afforded by their modularity, have yet to be achieved. In particular, it would be highly desirable to allow programmers and other users the ability to create and install distributed objects in a relatively transparent fashion so that objects created in different programming languages and/or objects residing on different computing platforms can be made available on distributed object systems without extensive re-invention of existing programming code, and without placing an undue burden on the user. Solutions to these problems would facilitate the development of object-oriented applications and distributed object applications, by allowing the programmer to focus on the tasks that required real creative effort and to minimize repetitive coding and analysis.

SUMMARY OF THE INVENTION

The present invention provides methods, apparatus, and computer program products that allow programmers to access and review distributed objects already installed on a distributed object system to determine whether such pre-existing objects can be included in software that is under development. As will be described in greater detail herein, the methods, apparatus, and computer program products for facilitating the re-use of distributed objects installed on a distributed object system enhance the efficiency of the software construction process and the reliability of the code so produced.

In one aspect, the present invention provides a computer-implemented method for selecting and reviewing a distributed object installed on a distributed object system. In one embodiment, the method of the invention includes generating a library of components corresponding to distributed objects on the distributed object system, including one component corresponding to the distributed object. Each of the components of the library includes information describing the distributed object to which the particular component corresponds. The contents of the library are displayed using a catalog interface device. The library is browsed using the catalog interface device to identify the component corresponding to the distributed object, and is selected. At least a portion of the information describing the distributed object is displayed.

In one embodiment of the above-described method, displaying the contents of the library comprises providing a display of at least a portion of the hierarchical directory structure of the library. In another embodiment, the step of browsing the library of components comprises selecting a file path using the display of the hierarchical directory structure of the library and displaying representations of components located in the path. In still another embodiment, the representations comprise icons, and the step of selecting comprises making a selection action on an icon.

In another aspect, the present invention provides a computer system for selecting and reviewing a distributed object installed on a distributed object system. In one embodiment of the computer system provided by the invention, the system comprises a library of components corresponding to distributed objects on the distributed object system, wherein each of the components includes information describing the distributed object to which the component corresponds. The library of components includes one component corresponding to the distributed object. The computer system of the invention further includes a library manager which is effective to locate and retrieve the components. Finally, a catalog interface device for displaying, reviewing and selecting the components in the library is provided. The catalog interface device is coupled with the library manager such that queries and selection actions made in the catalog interface device are communicated to the library manager.

In one embodiment, the computer system of the invention further includes a component generator which is effective to generate components corresponding to selected, installed distributed objects in the distributed object system. In a more specific embodiment, the component generator is coupled with the distributed objects to which the components refer. In another embodiment, the computer system of the invention includes a builder coupled with the component generator such that the components are generated when the distributed objects to which the components refer are processed by the builder. In still another embodiment, the catalog interface comprises a graphical user interface. In a more particular embodiment, the catalog interface device comprises a display of at least a portion of the hierarchical directory structure of the library.

In still another embodiment, the computer system provided by the present invention comprises a processing unit which is coupled to an input/output device. Random access memory is also coupled with the processing unit. A memory device is in communication with the processing unit. The memory device includes a distributed object reference data structure and an associated component data structure, the component data structure including presentation information, programmer information, and tool information relating to the distributed object data structure. In one embodiment, the computer system further includes a library of components contained in a library data structure residing in the memory device, the library of components including a library service effective to locate and retrieve the components in response to commands received from the input/output device.

In yet another aspect, the present invention provides a computer program product comprising a computer-usable medium having computer-readable program code embodied thereon for a component data structure. The component data structure is related to a distributed object data structure installed on a distributed object system and includes presentation information, programmer information, and tool information.

In one embodiment, the computer-readable program code devices include code devices effective for generating the component in addition to generating a library of component data structures corresponding to distributed object data structures on the distributed object system. Each of the component data structures includes information describing a distributed object data structure to which the component data structure corresponds. This embodiment also includes computer-readable program code devices configured to cause a computer to display the contents of the library using the catalog interface device in order to identify the distributed object data structures, to browse the library of component data structures using the catalog interface device in order to identify the distributed object data structures, and to display at least a portion of the information describing the distributed object data structures.

These and other aspects and advantages of the present invention will become more apparent when the description below is read in conjunction with the accompanying drawings.

DESCRIPTION OF SPECIFIC EMBODIMENTS

Figure 1:
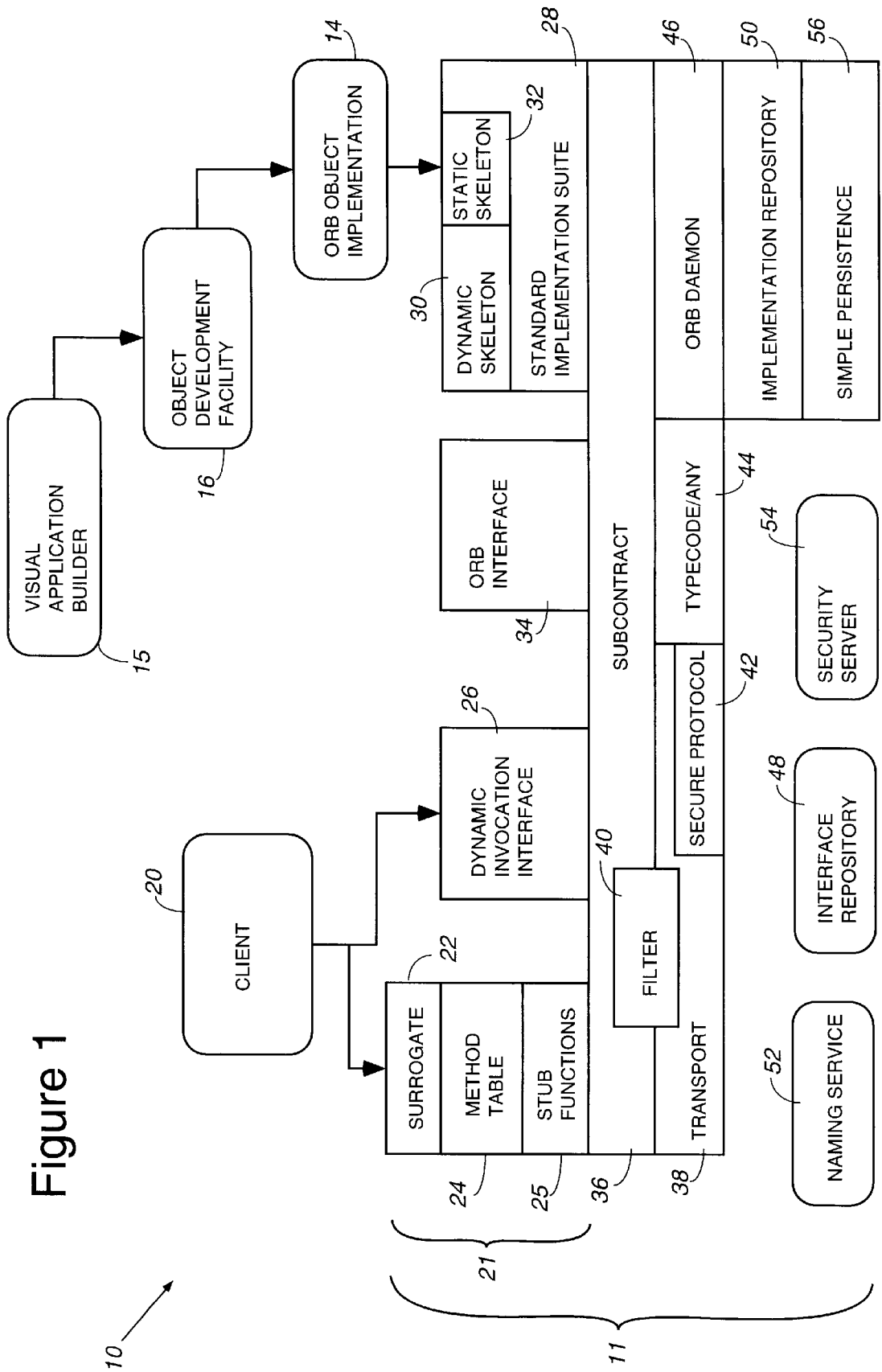
FIG. 1 is a schematic illustration of an object request broker (ORB) in accordance with the present invention.

Section 1 below describes the basic organization and operation of distributed object systems. Section 2, at page 15 below, describes the components, library services, and uses thereof, as provided by the present invention.

1. Embodiments and Background of Distributed Object Systems

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention, these operations are machine operations. Useful machines for performing the operations of the present invention include general purpose digital computers or other similar devices. In all cases, there should be borne in mind the distinction between the method of operation in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

In addition, the present invention further relates to computer-readable media which include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

A distributed object system 10 typically includes an Object Request Broker (ORB) 11 as is symbolically illustrated in FIG. 1. ORB 11 provides location and transport mechanisms and facilities necessary to deliver a call from a client to a servant (target object) and to return a response to the client. The client and servant may be located in the same process, in different processes on the same machine, or on completely different machines. For the purposes of this discussion, client 20 may be any code that invokes an operation on a distributed object and thus may or may not take the form of a distributed object or a process. A distributed object may have a wide variety of representations. By way of example, the distributed object may be a C++ object that has been provided by an application developer. Alternatively, an implementation for a distributed object may be developed within a visual application builder 15 as described in greater detail in Section 2 below. In brief, the visual application builder allows a developer to visually select existing object types from a catalog of object types available on the distributed object system and to graphically connect the services provided by the selected objects to create a new implementation for an object.

An object development facility 16 may be used to simplify the creation and the installation of distributed objects, in part, by "wrapping" or encapsulating developer objects in distributed object code as described in U.S. patent application Ser. No. 08/414,240 (pending). As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility 16 in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a subcontract layer 36, possibly a filter 40, and a transport layer 38. Stub 21 includes a surrogate 22, a method table 24 and stub functions 25. Client 20 communicates initially with surrogate 22 that appears to the client as the servant object. Alternatively, client 20 may communicate directly with the servant object through a dynamic invocation interface (DII) 26 instead of through surrogate 22, method table 24 and stub functions 25. Dynamic invocation interface 26 is used to enable clients to construct dynamic requests.

Subcontract layer 36 provides the functionality required by an object in order to utilize subcontracts to implement various services (or features or object mechanisms) named by a particular subcontract, as described in greater detail in U.S. Pat. No. 5,577,251, issued Nov. 19, 1996, incorporated herein by reference for all purposes. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in U.S. patent application Ser. No. 08/670,682 (pending), incorporated herein by reference for all purposes. Filter 40, if being used, may perform a variety of tasks, such as compression, encryption, tracing, or debugging, that are to be applied to communications to and from an object.

Transport layer 38 operates to marshal, unmarshal and physically transport information to and from a servant that typically does not share the same process as a client. Mechanisms for marshaling and unmarshaling inter-object communications are described in U.S. patent application Ser. No. 08/673,181 (pending). A technique for marshaling/unmarshaling an object reference is described in U.S. patent application Ser. No. 08/670,681 (pending).

A standard implementation suite 28 (or object adapter) represents a set of subcontracts that interact with ORB objects 14 in identical ways, as in object key management. One such implementation suite is described in U.S. patent application Ser. No. 08/669,782 (pending). It should be noted that a subcontract may belong to multiple implementation suites. Also, implementation suites may utilize different subcontracts. A skeleton, that may take the form of either static skeleton 32 or dynamic skeleton 30, is used to transform requests into a format required by a servant object. Thus, skeletons 30 and 32 call an appropriate servant object. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter. An ORB daemon 46 is responsible for ensuring that object servers are active when invoked by clients. A technique for starting object servers is disclosed in U.S. patent application Ser. No. 08/408,645 (abandoned), continued as U.S. patent application Ser. No. 08/835,994 (pending) which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between processes on the same machine. The security server 54 is a security administration server that secures the services that are used between processes on different computers.

Typecode/Any module 44 implements "Typecode" and "Any" objects. Typecode describes an Interface Definition Language (IDL) data type, allowing type descriptions to be transmitted between clients and servers. An instance of an IDL data type may be encapsulated by an Any object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. Such a technique is disclosed in U.S. patent application Ser. No. 08/677,013 now U.S. Pat. No. 5,830,774, which is incorporated herein by reference. A naming service 52 is used to name ORB objects. A client may use naming service 52 to find a desired object by name. Naming service 52 returns an object reference, that in turn may be used to send requests to that object. An Interface Repository 48 (IFR) knows about all interfaces for all objects within the distributed object system.

Figure 2:
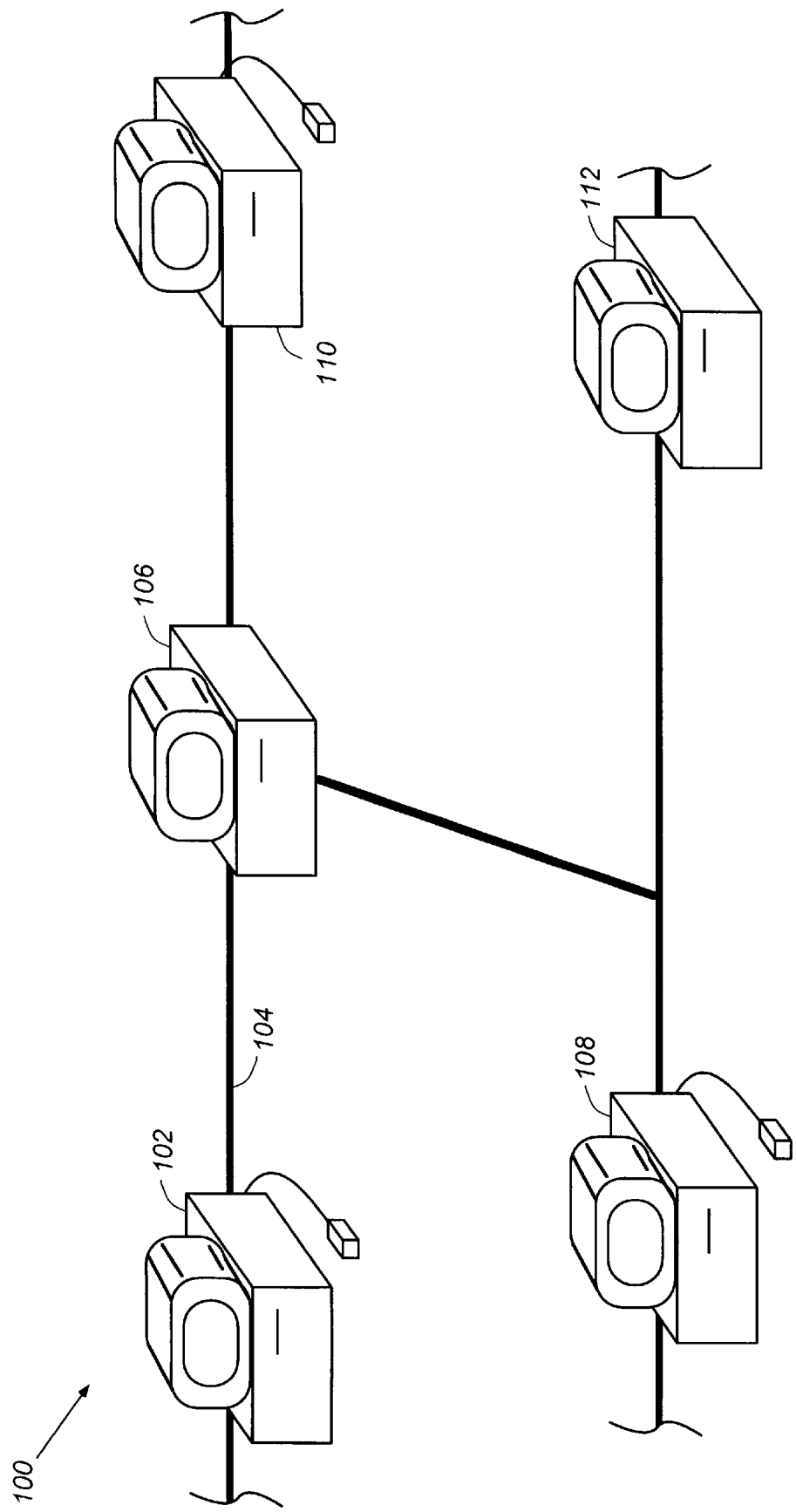
FIG. 2 is an illustration of a computer network in accordance with the present invention.

In an embodiment of the present invention, distributed objects are located on one or more computers linked together by a computer network such as the network illustrated at 100 in FIG. 2. As seen in FIG. 2, network 100 includes computer 102 coupled to a network 104. Network 104 can further include a server, router or the like 106 in addition to other computers 108, 110, and 112 such that data and instructions can be passed among the networked computers. The design, construction and implementation of computer networks will be familiar to those of skill in the art.

Figure 3:
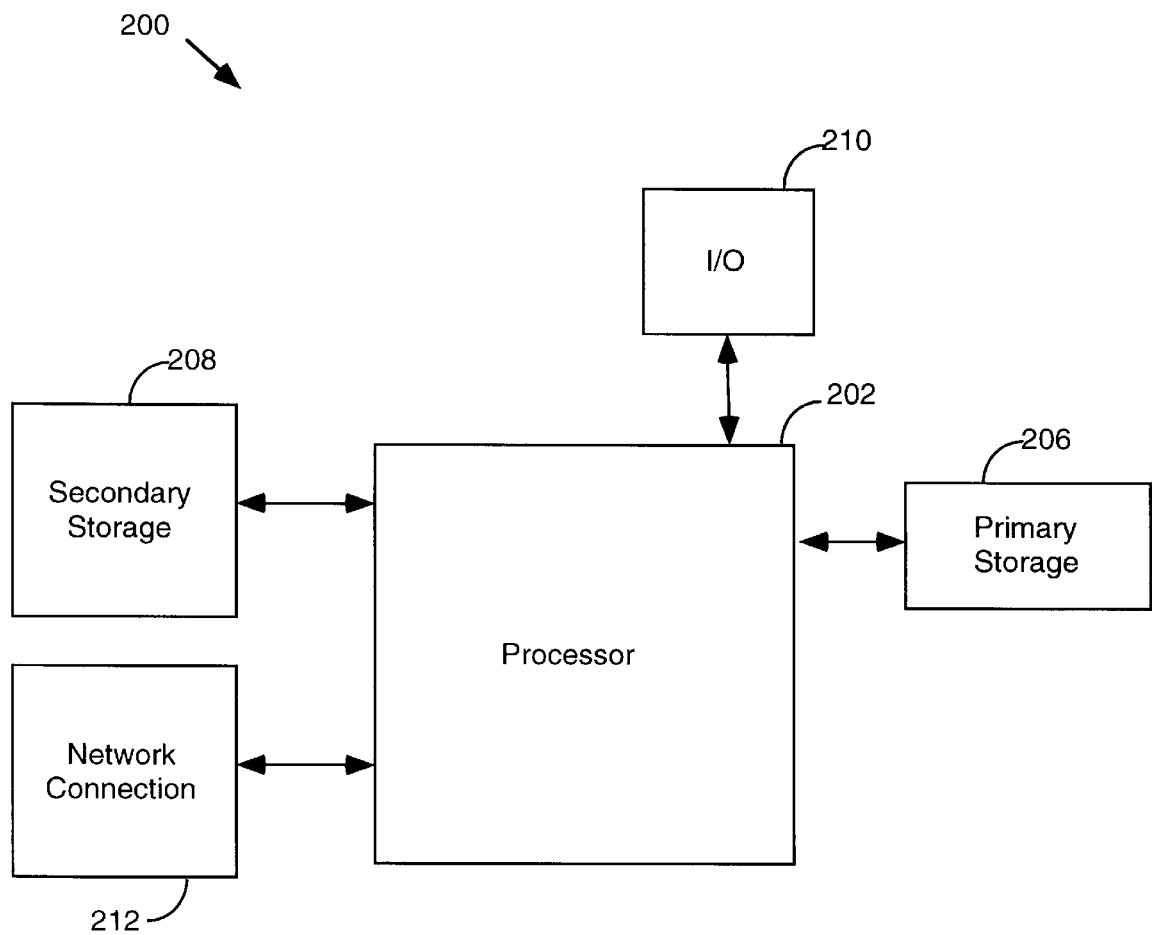
FIG. 3 is a schematic illustration of a computer system in accordance with the present invention.

Computers 102, 106, 108, 110, and 112 are illustrated schematically with respect to FIG. 3 at 200. Each computer includes a processing unit 202 effective for performing computations, such as, but not limited to, a central processing unit (CPU), or multiple processors including parallel processors or distributed processors. Processor 202 is coupled with primary memory 204 such as random access memory (RAM) and read only memory. Typically, RAM includes programming instructions and data, including distributed objects and their associated data and instructions, for processes currently operating on processor 202. ROM typically includes basic operating instructions, data and objects used by the computer to perform its functions. In addition, a secondary storage device 208, such as a hard disk, CD ROM, magneto-optical (floptical) drive, tape drive or the like, is coupled bidirectionally with processor 202. Secondary storage device 208 generally includes additional programming instructions, data and objects that typically are not in active use by the processor, although the address space may be accessed by the processor, e.g., for virtual memory or the like. Each of the above described computers further includes an input/output source 210 that typically includes input media such as a keyboard, pointer devices (e.g., a mouse or stylus) and the like. Each computer can also include a network connection 212. Additional mass storage devices (not shown) may also be connected to CPU 202 through network connection 212. It will be appreciated by those skilled in the art that the above described hardware and software elements, as well as networking devices, are of standard design and construction.

The computer-implemented methods described herein can be implemented using techniques and apparatus well-known in the computer science arts for executing computer program instructions on computer systems. As used herein, the term "computer system" is defined to include a processing device (such as a central processing unit, CPU) for processing data and instructions that is coupled with one or more data storage devices for exchanging data and instructions with the processing unit, including, but not limited to, RAM, ROM, CD-ROM, hard disks, and the like. The data storage devices can be dedicated, i.e., coupled directly with the processing unit, or remote, i.e., coupled with the processing unit, over a computer network. It will be appreciated that remote data storage devices coupled to a processing unit over a computer network can be capable of sending program instructions to a processing unit for execution on a particular workstation. In addition, the processing device can be coupled with one or more additional processing devices, either through the same physical structure (e.g., in a parallel processor), or over a computer network (e.g., a distributed processor.). The use of such remotely coupled data storage devices and processors will be familiar to those of skill in the computer science arts. The term "computer network" as used herein is defined to include a set of communications channels interconnecting a set of computer systems that can communicate with each other. The communications channels can include transmission media such as, but not limited to, twisted pair wires, coaxial cable, optical fibers, satellite links, or digital microwave radio. The computer systems can be distributed over large, or "wide" areas (e.g., over tens, hundreds, or thousands of miles, WAN), or local area networks (e.g., over several feet to hundreds of feet, LAN). Furthermore, various local- and wide-area networks can be combined to form aggregate networks of computer systems. One example of such a confederation of computer networks is the "Internet".

Figure 4:
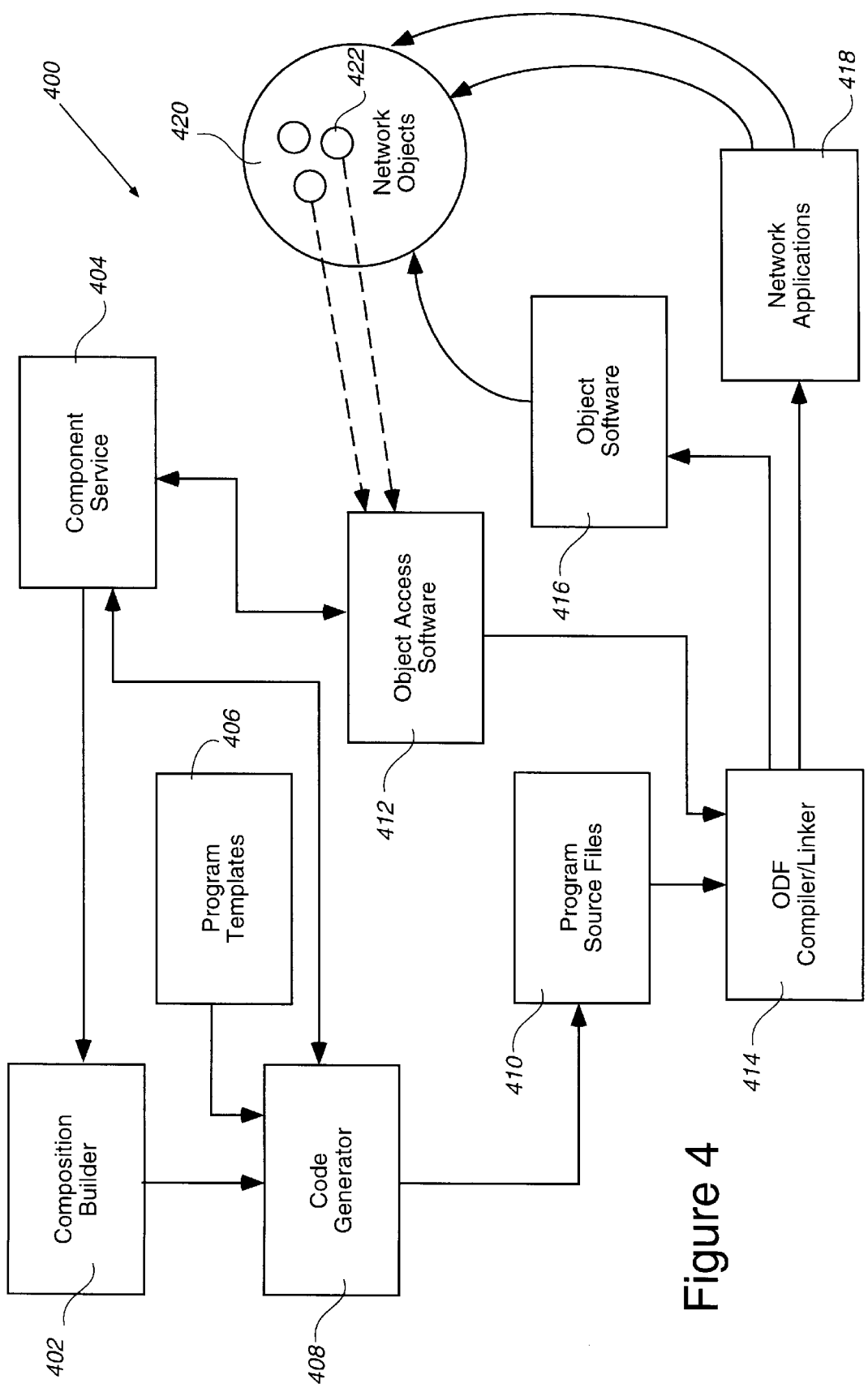
FIG. 4 is a schematic illustration of a system for constructing object-oriented applications in a distributed object system in accordance with the present invention.

FIG. 4 at 400 illustrates schematically one embodiment of a system for composing and installing object-oriented applications in a distributed object system. The illustrated system includes a composition builder 402 which the user, typically a programmer, employs to compose applications for installation on the distributed object system such as that shown in FIG. 1 described above. One embodiment of such a composition builder is described in co-pending U.S. patent application Ser. No. 08/675,850 (pending), filed on even date herewith and incorporated herein by reference for all purposes. The composition builder is coupled with a component service 404, described in greater detail hereinbelow, that provides the user or programmer access to objects available on the distributed object system. Composition builder 402 is further coupled to a code generator 408 which, in conjunction with program template repository 406, takes the composition created by the composition builder and produces program source files as shown at 410. Code generator 408 is described in greater detail in co-pending U.S. patent application Ser. No. 08/674,828 now U.S. Pat. No. 5,860,004, filed on even date herewith and incorporated herein by reference for all purposes.

Programs source files 410 are then forwarded to ODF compiler/linker 414 which is described in the above-incorporated U.S. patent application Ser. No. 08/414,240 (pending). In addition, ODF compiler/linker 414 is coupled with object access software 412 which object access software is coupled with component service 404. Object access software 412 comprises a set of stubs that are produced when an IDL compiler is used to prepare a language mapping for an IDL interface in accordance with OMG CORBA specifications for the construction of distributed objects. ODF compiler/linker 414 produces both object software 416 and network applications 418 which in turn access network objects 422 as shown generally at 420. These network objects can then be employed by the object access software 412 either for use in the component service 404 or in conjunction with ODF compiler/linker 414 as indicated by the dashed arrows.

2. Libraries of Components to Facilitate Re-Use of Distributed Objects

Figure 5:
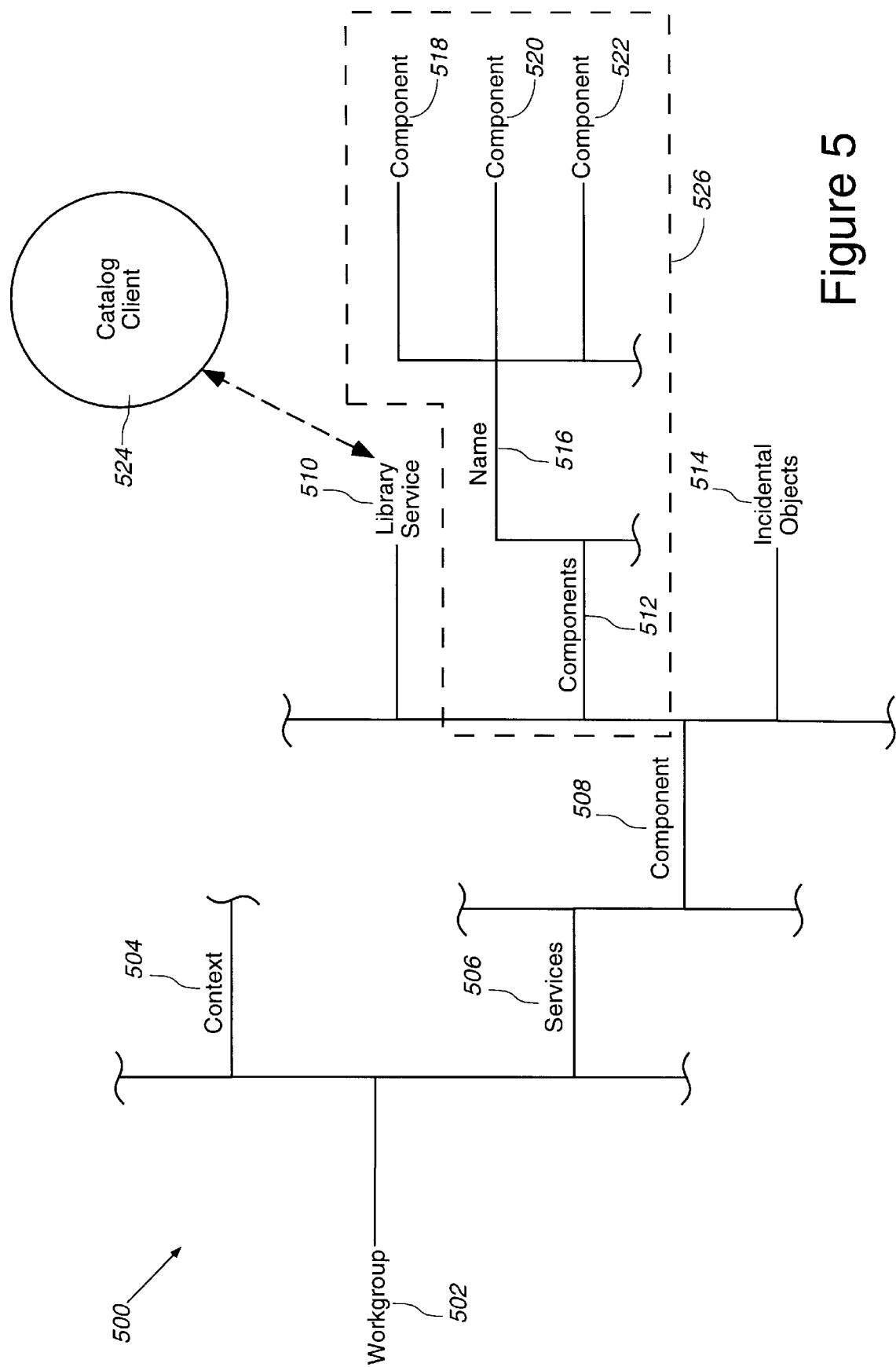
FIG. 5 is a schematic illustration of a hierarchical directory structure for storing, searching, and retrieving components corresponding to distributed objects in accordance with the present invention.

In one aspect, the present invention provides a development environment and devices adapted to facilitate the re-use of distributed object code in a distributed object system. An illustration of one embodiment of such an environment is provided at 500 in FIG. 5, which illustrates a hierarchical directory structure through which users (typically programmers) can browse, examine, and access components that represent distributed objects available for re-use across the distributed object system. Thus, it will be recognized that by using the hierarchical directory structure and library such as illustrated in FIG. 5 programmers will have access to code located at various points throughout the distributed object system through a central library of references to that code.

Referring now to hierarchical directory structure 500 in greater detail, it will be appreciated by those of skill in the art that the illustrated structure is representative of a naming service commonly used in distributed object systems. One example of such a naming service is that defined by *CORBA: A Guide to Common Object Request Broker Architecture*, Ben-Natan, Mcgraw-Hill, 1995, which is incorporated herein by reference for all purposes. At 502 a workgroup root directory is defined, from which root directory 502 extends subdirectories defining contexts such as Context 504. A particular context is a Services context shown at 506 from which extends various subdirectories indicating services available on the network including Component service 508. From Component service subdirectory 508 extends various services and components such as Library Service 510, Components subdirectory 512 and Incidental Objects subdirectory 514. Components subdirectory 512 includes a Naming context subdirectory 516 from which extends the individual components that represent distributed objects throughout the distributed object system such as shown at 518, 520, and 522.

Library service 510 is in communication with various Catalog clients, such as shown schematically at 524, through which users of the system access the Library Service to locate and access components such as those at 518, 520 and 522. In one embodiment, Library Service 510 manages Components subdirectory 512, and its subdirectories, as indicated by the dashed box at 526. Thus, in this embodiment the Library Service allows the user access to all of the components within the Components subdirectory 512 thereby providing a central location across which components can be searched and their related distributed objects identified and obtained for re-use in the development of new distributed object applications. In one embodiment, the Library Service is a distributed object acting as a server to provide a single "librarian" for the components, thereby giving consistency and managed access for multiple users across the network. In a particular embodiment, the library service provides both a file system and a query interface through which the names and various aspects of the components, such as their interfaces, can be searched by a user.

In the embodiment illustrated in FIG. 5, the present invention utilizes component objects (also referred hereinbelow to as "components") that represent distributed objects in the system. The components are made available through, e.g., Library Service 510 using Catalog Client 524, for users to search and browse to determine the nature of the distributed objects related to the components. It will be appreciated by those of skill in the distributed computing arts that such an arrangement offers advantages over a system in which references are made directly to the distributed objects. In particular, the distributed objects by their very nature are highly transient entities. In some cases, these objects are being modified and moved within the system so that it is difficult for any sort of library service, such as shown at 510, to maintain a record of the location of each distributed object without incurring large computational overhead.

It will also be appreciated that in a typical browsing action the user does not necessarily require access to the entirety of the distributed object immediately. Typically, the user is seeking more general information about the basic nature of the object and how the code within that object is used so that they may determine whether they desire access to the underlying distributed object in their code. In one embodiment, the present invention satisfies these needs by providing components that represent the build time descriptions of the distributed object to which each component refers. Thus, it will be recognized that the components provided by the invention act as place holders for distributed objects. The actual objects can be accessed at appropriate times during the construction of new applications such as described in co-pending U.S. patent application Ser. Nos. 08/675,850 (pending) and 08/674,828 now U.S. Pat. No. 5,860,004.

In one embodiment, the components themselves are objects and therefore are defined by an interface, such as an IDL interface, that provides the user with a description of the attributes and operations that define the available services provided by the underlying distributed object. In a particular embodiment, each component provides presentation information about the distributed object. In general, this information can be any information which helps to describe the screen presence of the distributed object being referred to by the component. Such presentation information includes, but is not limited to, the identity of any icon or icons used to identify the object on the distributed object system and any names used to refer to the distributed object. In one embodiment, two names are provided for each distributed object: a short name and a long name. The short name can be used, for example, by the file system to identify the object while the long name can be a more descriptive name to assist in the browsing and understanding of the nature of the object. Other types of presentation information include, but are not limited to, various icons used to reflect the state of the object (e.g., icons reflecting selected and deselected states, error states, and object types), as well as sounds.

In addition, in the described embodiment each component includes programmer information to assist the user or programmer in understanding the character of the code in the underlying distributed object. In one such embodiment, the programmer information comprises a data sheet provided in a suitable format, such as rich text format (RTF) or hypertext markup language (HTML), which is embodied in a data stream that is kept within the component. As will be familiar to those of skill in the distributed computing arts, a data stream is an array of bytes that are stored within an object and forwarded in response to requests for the information contained within the array. It will be appreciated that such an arrangement is advantageous over a file-based reference system as the need for hard addressing of files is eliminated. However, it will also be appreciated that a file-based method of providing data sheets is compatible with the scope of the present invention. Such an alternate embodiment could also be implemented by including pointers to files kept in a database. Examples of the types of programmer information contained in the data sheet include keywords to facilitate searching across the library of components for components representing objects having certain characteristics, and "hard" information that provides the user with data for compiling and using the underlying software.

In one embodiment, the hard information contained in the programmer information data sheet includes, but is not limited to, the interface definition of the underlying object, the factory interface definition for the object, the name or names of the methods used to acquire instances of the underlying object (e.g., the factory method name), the service name of the factory that is installed when the object is created, and the various plugs, sockets and properties that are available in the underlying distributed object. In addition, various installation information is included with the data sheet such as the names of header files for both the object and interface definitions of the distributed object, the locations of the header files, information describing necessary prerequisites to obtain the code required to compile and build the object, as well as macro definitions and compiler information.

Components can be constructed using a variety of methods. In one embodiment, the components are constructed during the building, packaging, and installation process performed when the object is constructed, such as described in above-referenced application Ser. No. 08/414,240 (pending). In this embodiment, a populator mechanism is used to take a text representation of the component data which is extracted from the object during the build and packaging stages to define and install the corresponding component automatically. It will be appreciated by those of skill in the programming arts that such a process greatly facilitates the re-use of code by making the generation of components relatively transparent to the programmer by relieving the programmer of the need to consciously construct a component by hand or otherwise initiate a separate process for the building and installation of components. Alternatively, the component can be constructed in a similar fashion through a builder, such as described in above-referenced application Ser. No. 08/674,828 now U.S. Pat. No. 5,680,004, through a mechanism similar to that just described. In still another embodiment the component interface can be defined through a service offered by the distributed object system so that a programmer can incorporate the service through the inheritance structure of the distributed object such that users can call on an object to have a component built from the object itself. Such an embodiment offers the advantage of providing programmers customizable methods of constructing components. The above-described methods can be implemented using standard techniques known to those of skill in the object programming arts and especially those of skill in the distributed object programming arts.

Figure 6:
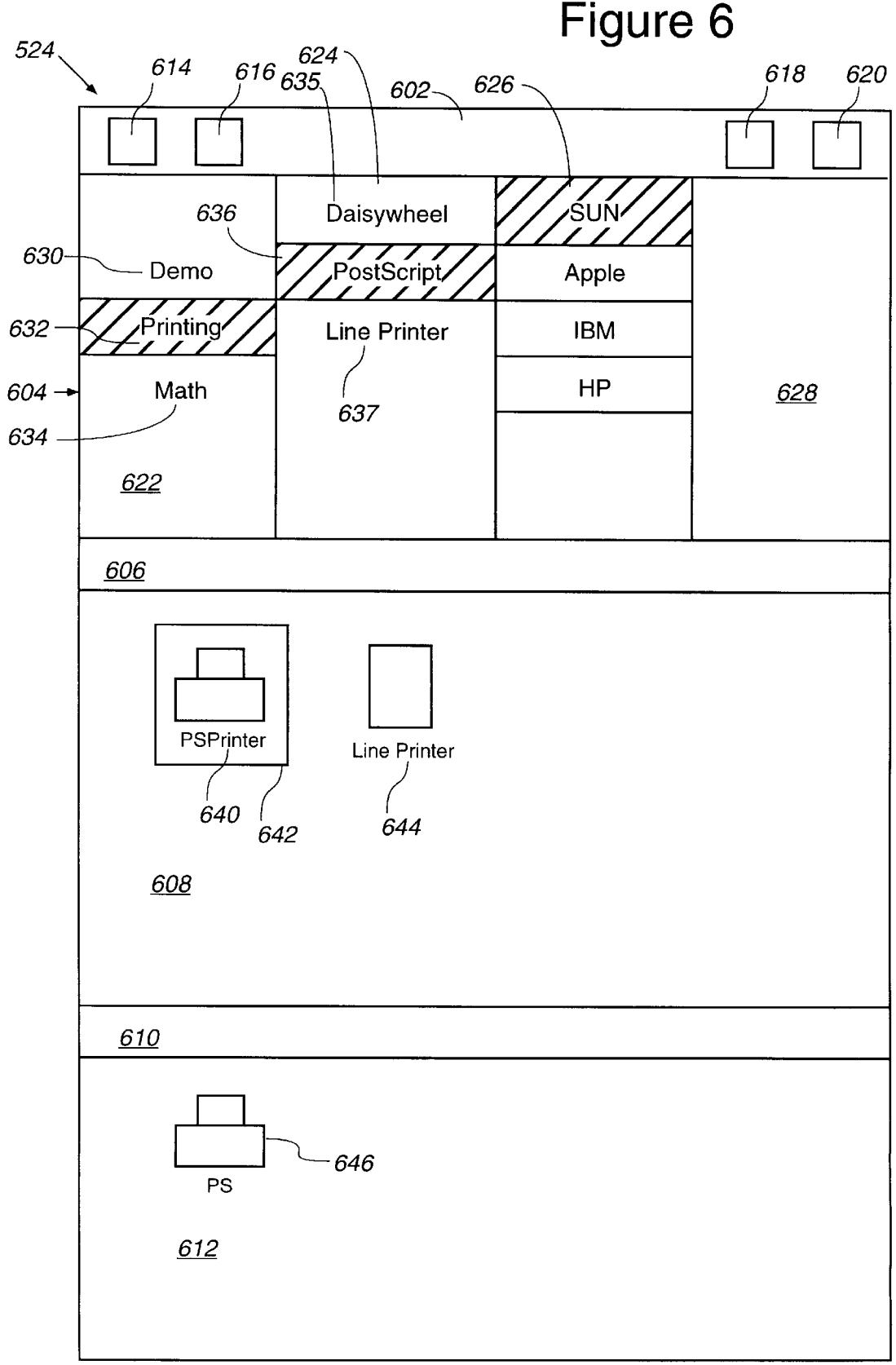
FIG. 6 is an illustration of a graphical user interface for searching and examining components according to one embodiment of the present invention.

One embodiment of catalog client 524 is illustrated in FIG. 6. This embodiment is an illustration of a graphical user interface (GUI) that can be incorporated with the visual application builder described in U.S. patent application Ser. No. 08/675,850 (pending). FIG. 6 illustrates catalog client 524 which includes a header bar 602, a context browser 604, a separator region 606, a component catalog viewer 608, a second separator region 610, and a detail viewer region 612. Within header region 602 are contained buttons 614, 616, 618 and 620. In one embodiment, buttons 614 and 616 control the display in region of 604. For example, depressing button 614 provides the illustrated browser view while depressing button 616 provides a query window into which query window search terms and other search parameters may be entered so that region 526 of FIG. 5 can be searched for components having desired properties. Similarly, buttons 618 and 620 in one embodiment are used to control the display of region 612. For example, button 618 when depressed can provide a view of data sheets for components that are selected in region 608 while, if button 620 is depressed, the representation of components that incorporate a component selected in region 608 is displayed.

In the illustrated embodiment, in which region 604 provides a browser over which the context hierarchy such as shown in region of 526 of FIG. 5 is shown, the user is presented with various columns 622, 624, 626, and 628 which contain the various contexts and subcontexts of the context structure. In the illustrated example, region 622 contains the contexts "Demo" 630, "Printing" 632 and "Math" 634. These represent the higher levels of the context hierarchy. In the illustration the context "Printing" 632 is shown as being selected, as indicated by the highlighted region surrounding that particular context. Within region 624 are shown those subcontexts that are directly subordinate to the selected context 632. These subcontexts include various printer types such as "Daisywheel" 635, "PostScript" 636, and "Line Printer" 637. A selection of "PostScript" context 636 provides a second set of subcontexts which depend directly from the PostScript selection as shown in region 626. These subcontexts include the selections "Sun", "Apple", "IBM" and "HP". The PostScript type "Sun" is illustrated as being selected. In the illustrated example, the choices in region 626 represent the lowest subcontext in the particular region of the context hierarchy being shown and, therefore, region 628 is empty. However, were the subcontext selected in region 626 to have subordinate subcontexts those subcontexts would appear in region 628.

Once a selection is made in region 626 (or the region listing the lowest-level contexts of the context hierarchy) a display of all components available within that subcontext are displayed in region 608 (in the case where the appropriate display alternative is selected). These components include "PS Printer" component 640 (shown as highlighted by highlighting box 642) and "Line Printer" component 644 (not highlighted). The selection of "PostScript" component 640, as indicated by border 642, provides a display of the data sheet "PS" 646 in region 612 (again, in the case where the appropriate display alternative is selected). In one embodiment, regions 604, 608, and 612 are scrollable so that information that extends beneath separator regions 606, 610, and the lower end of the window at 612, can be observed by the user. The construction of such a window can be performed using techniques and software familiar to those of skill in the art of graphical user interface programming. Typically operating systems for constructing GUI interfaces include, but are not limited to, OpenStep (available from Sun Microsystems, Mountain View, Calif.), X Windows (X Consortium, Cambridge, Mass.), Windows (Microsoft Corporation, Redmond, Wash.) and the Macintosh operating system (Apple Computer, Cupertino, Calif.).

As described in the above-incorporated, U.S. patent application Ser. Nos. 08/675,850 (pending) and 08/674,828 now U.S. Pat. No. 5,860,004, the use of components, and the information and links they contain to the underlying objects they represent, greatly facilitates not only the location of existing code for re-use, but also the development of distributed object applications by relieving the programmer or user of the burden of providing the large amounts of boilerplate computer code required for the basic housekeeping functions necessary for objects to be installed on the distributed object system. As described in greater detail in U.S. patent application Ser. No. 08/675,850 (pending), components presented through the component catalog to the user can be manipulated graphically and placed into worksheets. In these worksheets, compositions comprising parts are connected to define new applications to be installed on the distributed object system. The parts are derived from the components contained in the catalog, the components representing various existing distributed objects, modified distributed objects, or original distributed objects. The use of the programmer information (especially information relating to the plugs, sockets, and properties of the underlying objects represented by the components) is especially useful in such systems as the user then can graphically interconnect the plugs and sockets of various components (or their representations as parts) to define relationships among the distributed objects which will ultimately define the distributed object application without extensive examination of the underlying distributed object's code and the creation of large amounts of standard coding required to establish relationships among objects.

Furthermore, as described in U.S. patent application Ser. No. 08/674,828 now U.S. Pat. No. 5,860,004, the distributed application is defined using the information available in the components and through their graphical interconnections (e.g., as their derivative parts). A code generator facility (such as shown at 408 is FIG. 4) then retrieves the references contained in the programmer information (such as the factory IDL interface definitions, the names of methods used to acquire instances of objects, i.e., factory method names, service names for factories that are installed, header files, source code locations, macro definitions, and compiler information) and generates automatically the boilerplate code that is required to define the application as a distributed application and to install that distributed application on the distributed object system.

Thus it will be seen from the foregoing that the present invention substantially addresses the needs of distributed object programmers for systems that facilitate the reuse and generation of code. Using the component services described herein, programmers can quickly identify and access distributed objects that have already been developed and installed on the distributed object system. The ability to easily browse and select existing distributed objects in a highly communal fashion as provided by the centralized library service and hierarchical directory structure described herein increases the sense of "community" among programmers by providing a central repository for their code which can be examined and incorporated into ongoing software development projects. By using components which not only provide information regarding the identity, composition, and use of the distributed objects which the components represent, but also include references required to construct the necessary boilerplate code to install software on a distributed object system, the tedious work of hand-coding such boilerplate is largely removed from the programmer, thus, allowing the programmer to focus on the more creative problems with respect to developing and installing software on a distributed object system.

It will be appreciated by those of skill in the programming arts, and especially the distributed programming arts, that the various methods and devices described herein can be implemented in a large variety of ways without departing from the scope of the present invention. In particular, it is noted that various hierarchical directory structures other than that illustrated in FIG. 5 can be employed without departing from the present invention. In addition it is further noted that a variety of graphical user interfaces can be provided in addition to that shown in FIG. 6 herein. For example, browser 604 can be adapted to show both the context hierarchy and the individual components. Also, additional windows can be added to the catalog interface to provide views for both data sheets and component relationships in a substantially non-modal fashion. Finally, the composition of components may include more, or less information than described herein.

What is claimed:

1. A computer-implemented method of selecting and reviewing a distributed object installed on a distributed object system, said distributed object capable of being selected and reviewed from anywhere within said distributed object system, said method comprising:

generating a library of components corresponding to distributed objects on said distributed object system, said library of components storing said components and including one component corresponding to said distributed object, wherein said component within said library includes information describing the distributed object to which said component corresponds, said information including presentation information and programmer information characterizing the code of the distributed object and providing an interface for said distributed object;

displaying the contents of said library using a catalog interface device;

browsing said library of components using said catalog interface device to identify said one component corresponding to said distributed object;

selecting said one component corresponding to said distributed object; and displaying at least a portion of said information describing said distributed object using said selected component that represents said distributed object, whereby said interface may be used by a programmer to construct an application program using said distributed object available on the distributed object system.

2. The computer-implemented method of claim 1, wherein said library of components is organized in a hierarchical directory structure and said element of displaying the contents of said library includes:

providing a display of at least a portion of said hierarchical directory structure of said library.

3. The computer-implemented method of claim 2, wherein said hierarchical directory structure includes a display, and wherein said element of browsing said library of components includes:

selecting a file path using said display of said hierarchical directory structure of said library and displaying representations of components located in said path.

4. The computer-implemented method of claim 3, wherein said representations include icons and said element of selecting said component includes:

making a selection action on an icon.

5. The computer-implemented method of claim 1, wherein said information further includes tool information for said distributed object corresponding to said one component.

6. The computer-implemented method of claim 1, wherein said element of generating includes:

activating a component service supported by said distributed object.

7. The computer-implemented method of claim 1, wherein said element of generating includes:

generating said one component when said distributed object is installed on said distributed object system.

8. The computer-implemented method of claim 1, wherein said one component is generated when said distributed object is built.

9. A computer system for selecting and reviewing a distributed object installed on a distributed object system using a representative component, said distributed object capable of being selected and reviewed from anywhere within said distributed object system, said computer system comprising:

a library of components corresponding to distributed objects on said distributed object system, said library of components storing said components and including one component corresponding to said distributed object, wherein each of said components includes information describing the distributed object to which each of said components corresponds, said information including presentation information and programmer information characterizing the code of the distributed object and providing an interface for said distributed object;

a library manager which is effective to locate and retrieve said components; and a catalog interface device for displaying, reviewing and selecting said components in said library to review said information describing said distributed objects to which said components correspond, said catalog interface device being coupled with said library manager such that queries and selection actions made in said catalog interface device are communicated to said library manager, whereby said interface may be used by a programmer to construct an application program using said distributed object available on the distributed object system.

10. The computer system of claim 9, further comprising:

a component generator which is effective to generate components corresponding to distributed objects installed in said distributed object system.

11. The computer system of claim 10, wherein said component generator is coupled with the distributed objects to which said components refer.

12. The computer system of claim 10, further comprising:

an object development facility coupled with said component generator such that said components are generated when the distributed objects to which said components refer are processed by said object development facility.

13. The computer system of claim 10, further comprising:

a builder coupled with said component generator such that said components are generated when the distributed objects to which said components refer are processed by said builder.

14. The computer system of claim 9, wherein said catalog interface device includes a graphical user interface.

15. The computer system of claim 14, wherein said graphical user interface includes a display of at least a portion of a hierarchical directory structure of said library.

16. The computer system of claim 15, wherein said graphical user interface further includes a display of representations of said components located in a chosen file path.

17. The computer system of claim 16, wherein said representations are icons.

18. The computer system of claim 9, wherein said information further includes tool information for said distributed object corresponding to said one component.

19. A component data structure embodied in a computer-readable medium within a distributed object system, said component data structure comprising:

a reference to a distributed object installed on said distributed object system which said component data structure represents, said distributed object capable of being selected and reviewed from anywhere within said distributed object system;

presentation information describing the screen presence of said distributed object;

programmer information characterizing the code of said distributed object and providing an interface for said distributed object; and tool information relating to said distributed object, whereby said component data structure serves as a place holder for said distributed object for use in browsing distributed objects of said distributed object system, and whereby said interface may be used by a programmer to construct an application program using said distributed object available on the distributed object system.

20. The computer-readable medium of claim 19, further comprising:

a plurality of said component data structures contained in a library, said library storing said component data structures; and a library service effective to locate and retrieve said component data structures in response to commands received from an input/output device of said distributed object system.

21. The computer-readable medium of claim 19, further comprising:

a component catalog coupled with said library service and said input/output device.

22. The computer-readable medium of claim 19, wherein said component catalog includes a graphical user interface.

23. A computer-readable medium comprising computer code for selecting and reviewing a distributed object installed on a distributed object system, said distributed object capable of being selected and reviewed from anywhere within said distributed object system, said computer code of said computer-readable medium effecting the following:

generating a library of component data structures corresponding to distributed objects on said distributed object system, said library storing said component data structures and including one component data structure corresponding to said distributed object, wherein each of said component data structures includes information describing the distributed object to which each of said component data structure corresponds, said information including presentation information and programmer information characterizing the code of the distributed object and providing an interface for said distributed object;

displaying the contents of said library using a catalog interface device;

browsing said library of component data structures using said catalog interface device to identify said one component data structure corresponding to said distributed object;

selecting said component data structure corresponding to said distributed object; and displaying at least a portion of said information describing said distributed object using said selected component that represents said distributed object, whereby said interface may be used by a programmer to construct an application program using said distributed object available on the distributed object system.

24. The computer-readable medium of claim 23, further comprising computer code for:

activating a component service supported by said distributed object.

25. The computer-readable medium of claim 23, further comprising computer code for:

generating said component data structure when said distributed object is installed on said distributed object system.

26. The computer-readable medium of claim 23, further comprising computer code for:

generating said component data structure when said distributed object is built.

* * * * *